(12) United States Patent
Kumar et al.

(10) Patent No.: US 9,531,015 B2
(45) Date of Patent: Dec. 27, 2016

(54) SEAL COMPOSITIONS, METHODS, AND STRUCTURES FOR PLANAR SOLID OXIDE FUEL CELLS

(71) Applicant: BLOOM ENERGY CORPORATION, Sunnyvale, CA (US)

(72) Inventors: Ananda H. Kumar, Fremont, CA (US); Dien Nguyen, San Jose, CA (US); Martin Janousek, Sunnyvale, CA (US); Tad Armstrong, Burlingame, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 0 days.

(21) Appl. No.: 14/992,203

(22) Filed: Jan. 11, 2016

(65) Prior Publication Data

US 2016/0118674 A1    Apr. 28, 2016

Related U.S. Application Data

(62) Division of application No. 14/243,588, filed on Apr. 2, 2014, now Pat. No. 9,252,434, which is a division of application No. 12/292,078, filed on Nov. 12, 2008, now Pat. No. 8,691,470.

(51) Int. Cl.

| | |
|---|---|
| *H01M 2/08* | (2006.01) |
| *H01M 8/02* | (2016.01) |
| *C03C 8/02* | (2006.01) |
| *C03C 8/24* | (2006.01) |
| *H01M 8/12* | (2016.01) |

(52) U.S. Cl.
CPC .............. *H01M 8/0286* (2013.01); *C03C 8/02* (2013.01); *C03C 8/24* (2013.01); *H01M 8/0282* (2013.01); *H01M 8/1246* (2013.01); *H01M 2008/1293* (2013.01); *Y02E 60/50* (2013.01)

(58) Field of Classification Search
CPC  H01M 8/0282; H01M 8/0286; H01M 8/1246; H01M 2008/1293; Y02E 60/50; C03C 8/02; C03C 8/24
See application file for complete search history.

(56) References Cited

U.S. PATENT DOCUMENTS

| | | | | |
|---|---|---|---|---|
| 5,296,301 | A * | 3/1994 | Nawa | C22C 29/12 428/472 |
| 2003/0232173 | A1* | 12/2003 | Saito | B08B 3/08 428/141 |
| 2004/0234428 | A1* | 11/2004 | Tanahashi | B82Y 30/00 422/180 |
| 2007/0173591 | A1* | 7/2007 | Kanae | C08L 15/00 524/502 |

* cited by examiner

*Primary Examiner* — Raymond Alejandro
(74) *Attorney, Agent, or Firm* — The Marbury Law Group PLLC

(57) ABSTRACT

A seal composition includes a first alkaline earth metal oxide, a second alkaline earth metal oxide which is different from the first alkaline earth metal oxide, aluminum oxide, and silica in an amount such that molar percent of silica in the composition is at least five molar percent greater than two times a combined molar percent of the first alkaline earth metal oxide and the second alkaline earth metal oxide. The composition is substantially free of boron oxide and phosphorus oxide. The seal composition forms a glass ceramic seal which includes silica containing glass cores located in a crystalline matrix comprising barium aluminosilicate, and calcium aluminosilicate crystals located in the glass cores.

9 Claims, 3 Drawing Sheets

SEAL COMPOSITIONS, METHODS, AND STRUCTURES FOR PLANAR SOLID OXIDE FUEL CELLS

BACKGROUND

The present invention relates generally to the field of glass ceramic seals and seal compositions, and in particular to those suited for solid oxide fuel cells (SOFCs).

SOFC systems typically employ a seal on a component surface, such as a surface of interconnect elements, to seal the fuel gases from the ambient air. However, there is still a need to develop improved seals. Particularly, glass ceramic seals that exhibit little or no degradation from contact with the fuel or ambient gases, are of interest.

SUMMARY

One embodiment describes a seal composition includes a first alkaline earth metal oxide, a second alkaline earth metal oxide which is different from the first alkaline earth metal oxide, aluminum oxide, and silica in an amount such that molar percent of silica in the composition is at least five molar percent greater than two times a combined molar percent of the first alkaline earth metal oxide and the second alkaline earth metal oxide. The composition is substantially free of boron oxide and phosphorus oxide.

In another embodiment, the seal composition forms a glass ceramic seal which includes silica containing glass cores located in a crystalline matrix comprising barium aluminosilicate, and calcium aluminosilicate crystals located in the glass cores.

DETAILED DESCRIPTION

Figure 1A:
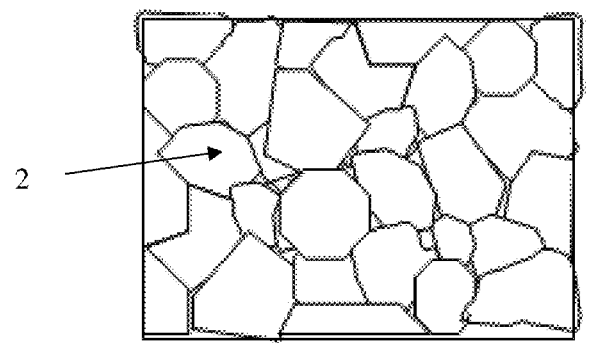
FIGS. 1A-C represent different stages of a powder composition being converted into a glass ceramic seal.

Embodiments of the invention provide a family of barium and calcium aluminosilicate (BaO—CaO—$Al_2O_3$—$SiO_2$) glass ceramic seal compositions for solid oxide fuel cell (SOFC) stacks. The glass ceramic preferably contains a microstructure that is stable and unchanging over the operating life of the fuel cell, and capable of resisting prolonged exposure to air, and dry and wet fuels. The microstructure preferably includes a barium rich barium aluminosilicate crystalline matrix surrounding barium lean glass regions comprising silica and calcium aluminosilicate crystallines. In other words, the microstructure comprises a crystalline matrix surrounding glass regions or "grains". The glass regions or "grains" may comprise discrete three dimensional regions, such as quasi-spherical regions, which are embedded in the matrix and may not be connected to each other. The glass regions or "grains" contain additional crystallites which may comprise a different composition from the crystalline matrix. This microstructure differs from prior art glass ceramic seal compositions which comprise a glass matrix containing crystallites.

Furthermore, in the prior art glass and glass ceramic compositions, boron oxide is used to lower the glass transition temperature of the compositions. However, boron oxide remains behind as the glassy matrix in which silica crystallites are located. Specifically, boron trioxide in the seal reacts with the moisture in the fuel gas mixtures to give rise to micro-bubbles in the glass, which may coalesce to larger bubbles or huge gaps in the seal structure. The loss of boron is also associated with crystallization of vitreous barium-aluminum-calcium-boron-silicate glass (BACS) seals, in about 1000 hours or less. The loss of boron leaves in its wake a rigid foamy structure consisting of crystalline phases, Hexacelsian, and Cristobalite. Such a structure is not expected to be leak tight to fuel gases, and will be mechanically very fragile.

Even in glass and glass ceramic compositions of alkaline earth silicates containing a low content (1.5 to 6 mol. %) boron oxide, the silicate species generally crystallize out during sealing, leaving behind a highly boron-enriched residual glass phase, which forms the continuous matrix in the seal microstructure. This glass matrix is generally more fluid than the parent glass, and becomes vulnerable to boron loss and associated problems. For example, the boron-rich glass phase can get forced out to the adjacent surfaces of the fuel cell stack under pressure leaving behind powdered crystalline mass. The boron-rich residual gas also becomes reactive with wet fuel and gets removed as volatile boron oxyhydrides.

Preferably, the seal composition of the embodiments of the invention is substantially free of boron or boron oxide, such as boron trioxide. More preferably, the seal composition is also free of phosphorus oxide and hydrogen reducible species, such as arsenic, lead or zinc oxides.

The glass ceramic seals can be formed on surfaces of fuel cell system components, such as metal or ceramic interconnect surfaces or fuel cell surfaces, such as ceramic electrolytes of solid oxide fuel cells. For example, the seals may comprise ring shaped (i.e., "donut" type) seals which are formed on an air side of a planar metal alloy interconnect, such as a Cr—Fe alloy interconnect, around an fuel riser opening in the interconnect. This seal prevents the fuel from flowing between the air side of the interconnect and a cathode (i.e., air) electrode of an adjacent solid oxide fuel cell. Non-limiting examples of internally manifolded planar solid oxide fuel stacks including interconnects and solid oxide fuel cells with fuel inlet and outlet openings which are sealed by the ring shaped seals as illustrated in U.S. application Ser. No. 12/010,884 filed on Jan. 30, 2008 which is incorporated by reference herein in its entirety. Other interconnects and seal compositions may also be used.

Seal Composition

In one embodiment, a seal composition comprises (a) a first alkaline earth metal oxide, (b) a second alkaline earth metal oxide, (c) aluminum oxide and (d) silica.

The first and second alkaline earth metal oxides are different from one another, but otherwise can be independently chosen from oxides of calcium, strontium, barium and lanthanum. In a non-limiting example, the first and second alkaline earth metal oxides can be calcium oxide and barium oxide, respectively. Preferably, the second oxide, such as barium oxide, precipitates into the grain boundaries between glass particles during partial crystallization of the glass ceramic composition. Thus, the first alkaline earth metal oxide may comprise 100 molar percent calcium oxide or it may comprise 80 to 99 molar percent calcium oxide substituted by 1 to 20 molar percent of one or both of strontium or lanthanum oxides. The second alkaline earth metal oxide may comprise 100 molar percent barium oxide or it may comprise 80 to 99 molar percent barium oxide substituted by 1 to 20 molar percent of one or both of strontium or lanthanum oxides.

The amount of the first and second alkaline earth metal oxides in the composition can vary depending on the desired properties of the resulting seal. In one embodiment, the first alkaline earth metal oxide content in the composition is at least about 5 mol. %. For example, the first alkaline earth metal oxide content can be between about 5 mol. % and about 25 mol. %, such as between about 7 mol. % and about 20 mol. %. Similarly, in one embodiment, the second alkaline earth metal oxide content in the composition is at least about 2 mol. %. For example, the second alkaline earth metal oxide content can be between about 2 mol. % and about 25 mol. %, such as between about 4 mol. % and about 20 mol. %. It should be noted that oxide content described above includes first and second alkaline earth metal oxides which are incorporated into binary and/or ternary oxides in the final seal composition. If the starting materials for the seal composition comprise oxides, then the above contents may also refer to the respective starting material oxide contents in addition to the contents in the final seal composition. If the starting materials comprise carbonate or other compounds, then the above contents may refer to final seal composition.

The relative mole ratio between alkaline earth metal oxides may influence the physical properties (e.g. coefficient of thermal expansion, "CTE") of the resulting seal. For solid oxide fuel cell stacks containing ceramic solid oxide fuel cells having a yttria or scandia stabilized zirconia electrolytes and a Cr—Fe alloy interconnects, the ratio of the seal oxides is selected such that the coefficient of thermal expansion of the seal composition is between about $5 \times 10^{-6}/°$ C. and about $11 \times 10^{-6}/°$ C. to match the coefficient of thermal expansion of the fuel cells and interconnects. Accordingly, in one embodiment the relative molar ratio of the first to second alkaline earth metal oxides is at least about 1:1, respectively. In another embodiment, the relative mole ratio of the first to second alkaline earth metal oxides is between about 5:1 and about 1:5, respectively.

The aluminum oxide content may vary depending on the amount of the other components in the composition such as the amount of silica and the first and second alkaline earth metal oxides. For example, the aluminum oxide content may be provided to ensure that the ternary silicates formed from the composition comprise aluminum. Alternatively, the aluminum oxide content may be determined independently of the amounts of other components. In one embodiment, the aluminum oxide content is at least about 5 mol. %. For example, the aluminum oxide content can be between about 5 mol. % and about 15 mol. %, such as between about 7% and about 13.5 mol. %. If the starting material for the seal composition comprises aluminum oxide, then the above content may also refer to the respective starting material oxide content in addition to the content in the final seal composition.

Silica is an important component of the seal composition. In the present embodiments, the silica content in the composition is in an amount such that after the seal is formed from the composition, an excess amount of silica (also referred to as "free silica") remains in the seal. Specifically, free silica may be considered as a silica content remaining after the amount of silica contained in crystallized binary or ternary silicates of the alkaline earth oxides is subtracted out of the initial silica content of the glass. Without wishing to be bound to any particular theory, it is believed that the presence of "free" or excess silica in the seal allows formation of a residual glass phase which aids in holding the seal microstructure together, even though the glass ceramic lacks traditional glass formers, such as boron or phosphorus oxides.

The amount of silica to be used in the composition may be determined based on the amount of the alkaline earth metal oxides and/or other components in the composition, or determined independently. In one embodiment, the silica content (in molar percent) is greater by at least five molar percent than two times the combined content (in molar percent) of the first and second alkaline earth metal oxides. As a non-limiting example, formula (1) can be used to determine the amount of silica to be used in the composition:

$$xSiO_2 - 2*(yA+zB) \geq 5 \text{ mol. \%} \quad (1)$$

where,
x=silica mol. %,
y=first alkaline earth metal oxide mol. %,
z=second alkaline earth metal oxide mol. %,
A=first alkaline earth metal oxide (such as calcium oxide), and
B=second alkaline earth metal oxide (such as barium oxide).
The amount of free silica may comprise at least 5 molar percent, such as 5 to 25 molar percent, for example 9 to 18 molar percent. In other words, $xSiO2-2*(yA+zB) \geq 5$, such as 5 to 25 mol. %, for example 9 to 18 mol. %.

In another embodiment, the silica content in the seal composition is such that after the seal is formed, the excess or free silica content (i.e., silica that is not incorporated into a binary or ternary metal oxide) in the seal is at least about 2 mol. % of the entire seal. For example, the silica content in the composition can be such that after the seal is formed from the composition, the seal contains between about 2 mol. % and about 20 mol. % free silica, such as between about 5 mol. % and about 15 mol. % free silica. In yet another embodiment, the total silica content (i.e., free silica and silica contained in binary and ternary oxides) in the seal composition is at least about 45 mol. %. For example, the silica content in the composition can be between about 45 mol. % and about 65 mol. %, such as between about 50 mol. % and 60 mol. %. If the starting material for the seal composition comprises silica (rather than another silicon and oxygen containing compound), then the above content may also refer to the respective starting material oxide content in addition to the content in the final seal composition.

In some embodiments, the seal composition may optionally comprise an amount of a fluxing agent. A non-limiting example of a fluxing agent is potassium oxide or strontium oxide. In general, the fluxing agent should not be highly mobile as this may reduce electrical resistivity of the seal. The amount of fluxing agent may vary depending on the desired microstructure of the formed seal. For example, the fluxing agent content in the composition can be between about 0 mol. % and about 5 mol. %, such as between about 1 mol. % and about 2 mol. %. The fluxing agent may be omitted if desired.

In some embodiments, the seal composition may optionally comprise a bulk nucleation additive. Examples of nucleating additives include, but are not limited to, transition metal oxides such as $TiO_2$ and $ZrO_2$. The amount of the nucleating additive may be between about 0 mol. % and about 5 mol. %, such as between about 1 mol. % and 2 mol. %. The additive may be omitted if desired.

The seal compositions of the present embodiments can be substantially free of boron oxides and phosphorus oxides. For example, substantially free means that the composition may comprise less than about 0.5 mol. % boron oxide(s) and/or less than 0.5 mol. % of phosphorus oxide(s), including no boron or phosphorus oxide. Limiting the boron oxide and phosphorus oxide content in the composition is beneficial for several reasons. As noted above, boron oxide in relatively high amounts can react with moisture in the fuel gases to give rise to micro-bubbles in the seal which may coalesce into larger bubbles or large gaps thereby weakening the seal structure. As another example, seals with high boron oxide content can form a boron-rich glass phase which can get forced out of the seal leaving behind a powdered crystalline mass. Moreover, a boron-rich residual gas formed by reaction of boron oxide with the fuel can react with the fuel cell components.

Additionally, the seal compositions of the present embodiments can be substantially free of hydrogen reducible species. Examples of hydrogen reducible species include, but are not limited to arsenic oxide, lead oxide and zinc oxide. In some cases, the composition may comprise less than about 0.5 mol. % of hydrogen reducible species, including zero mol. %. Again, limiting such reactive species is beneficial for maintaining the integrity of the resulting seal.

Thus, the following non-limiting observations are made regarding the composition. The starting glasses for obtaining the seal structures are silicate glasses in the true sense, because all other glass formers such as $B_2O_3$, $PO_5$, $As_2O_3$, and PbO, are preferably excluded in the glass formulations. The composition also preferably excludes easily reducible species such as $As_2O_3$, PbO and ZnO.

As noted above, the silica content of the glass, which largely determines the softening point of the glass, may be in the range of 50 mol. % to 65 mol. %. These glasses will have their softening points in the desired range of 750-900 C, for fuel cells operating in the temperature range of 750 C-900 C. Once the seal is set, the crystallization of the glass tends to increase its softening point significantly.

The high silica content of these seal compositions, and the absence of $B_2O_3$ and $P_2O_5$ ensures that the initial glass composition does not easily crystallize by bulk nucleation, i.e., within the glass grains. However, some high silica compositions can benefit from nucleating additives such as $TiO_2$ or $ZrO_2$, up to 2 mol. % of these additives. The above composition can also include up to 2 mol. % $K_2O$ or other fluxing agents for the residual silica after the precipitation of binary and ternary silicates of Ba and Ca. Li and Na oxides are undesirable because their high mobility in glass at fuel cell operating temperatures could lead to low electrical resistivity in the seals.

The bulk of the remaining initial glass composition should contain at least two alkaline earth oxides, such as BaO and CaO as glass 'modifiers'. A single oxide species is not desirable because particles of such glasses have a tendency to crystallize readily during heating, preventing the full densification of seal structure. The ratio of the two oxides can be varied over a wide range to manipulate CTE of the resulting seal. The larger the BaO:CaO ratio, the higher will be the CTE of the seal. Use of MgO as a modifier is not precluded but is also not desired because it may cause premature crystallization hindering effective sealing.

As discussed above, the total amount of the two modifier oxides should not exceed a value where the residual "free silica" is at least 5 mol. %. This amount of residual silica is desired to keep the resulting glass ceramic from disintegration. Without this residual silica content, the glass particles crystallize easily during heating without first coalescing, to give a porous crystalline bisque which will not form a hermetic or adherent seal. Comparative example 3 below is an example of a glass composition that is not suitable for sealing application.

Finally, the alumina in the glass is assumed to form ternary silicates with BaO and CaO, and so is not, therefore, a factor in the calculation of 'free-silica'. Alumina plays an important role in forming ternary silicates with higher coefficients of thermal expansion. The alumina content should not exceed 15 mol. %

Seal Formation

The seal compositions described above can be used to form a seal that is highly suited for fuel cell components. In one embodiment, a method of forming a seal comprises applying the seal compositions to one or more surfaces and heating the composition to form a seal. Preferably the surface is a surface of a solid oxide fuel cell component, such as an interconnect surface. Preferably the seal is a glass ceramic material.

The seal compositions can be applied as a paste comprising glass powders or as a green tape. Methods of making glass powders are known in the art. For example, the glass can be batched from the respective oxides or carbonates and melted at around 1600° C., homogenized by stirring, if necessary, and poured out. The glass can be subsequently dry or wet milled to obtain powdered glass. To form the paste, the powdered glass can be mixed with suitable organic vehicles (e.g. Terpeniol), binders (e.g. Butvar) and plasticizers (e.g. benzoflex). The glass paste or slurry can also be first cast as a green tape, cut into seal shape and then applied to a surface to form the seal.

Pastes and green tapes formed from the seal compositions can be applied to a variety of surfaces located in a fuel cell system. Such surfaces include, but are not limited to, fuel cell component surfaces, interfaces between surfaces and surface cracks/imperfections. In a non-limiting example, the paste is applied to an interconnect surface. Once formed, the resulting seal can be useful, for example, to seal the fuel inlet and exhaust streams from the air inlet and exhaust streams and from the ambient.

Methods of applying pastes or green tapes are known in the art. As a non-limiting example, the paste may be dispensed onto a surface and spread/shaped using a straight edge. In some cases, it may be desired to used both a green tape and a paste. Still, in other cases, it may be desirable to use multiple layers of a paste and/or green tape. In such cases, the layers may be successively formed on top of each other with or without an intermediate layer. For example, a layer of a paste or green tape may be applied to a surface of a fuel cell component, then heated to form a seal, and another layer applied onto the formed seal. Alternatively, successive layers of a paste or green tape may be applied on top of one another and the multi-layer structure can be heated to form a seal.

Heat treatments for converting the paste/green tape layer(s) into a glass ceramic seal can vary depending on the seal composition, paste/green tape thickness, desired microstructure of the seal, physical properties of the seal or a combination thereof. In one embodiment, the paste or green tape is heated at a temperature sufficient to form a glass ceramic material. In another embodiment the paste or green tape is heated at a temperature sufficient to form crystalline silicates on the glass particles and/or within the glass particles. In a non-limiting example, the seal is formed at a temperature between about 700° C. and about 1100° C., such as between about 900° C. and about 1000° C. The heating rate can be, for example, between about 1° C. and about 12° C., such as between about 3° C. and about 10° C.

A conventional furnace can be used to heat the fuel cell component(s)/seal composition in order to form a seal. However, it may be possible that the operating temperature of the fuel cell (e.g. solid oxide fuel cell) stack, provides sufficient heat to form a seal from the composition. Additionally, in some cases, it may be desirable to place a mechanical load, such as a 100 to 500 pound static load, on the seal composition as it is heated. For example, the seal composition may be placed in a fuel cell stack which is compressed and heated to convert the glass paste into a glass ceramic seal composition.

Figure 1B:
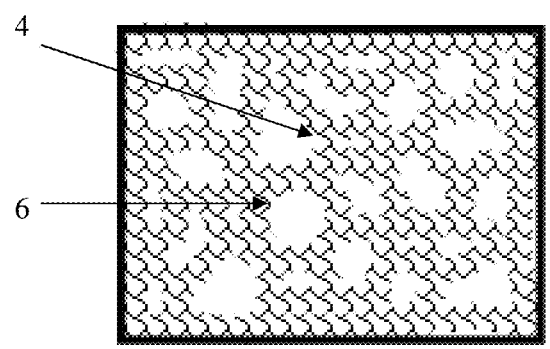
Figure 1C:
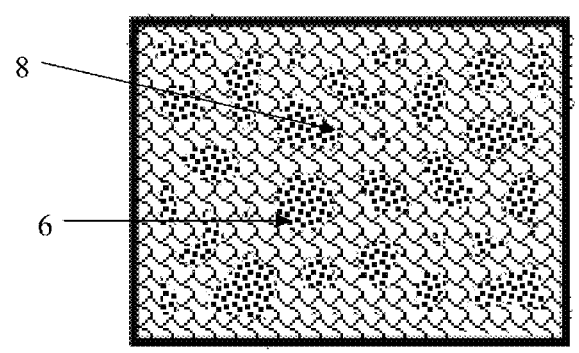

In one embodiment, the heating temperature, rate and duration allows the glass particles in the paste or green tape to first sinter (becoming glass grains), followed by formation of silicates on the glass grain boundaries, and finally formation of crystalline silicates within the glass grains. This embodiment is further illustrated in a non-limiting fashion in FIGS. 1A-C. As shown in FIG. 1A, the glass particles 2 of the seal composition initially sinter and seal by coalescence just below the glass softening point. The softening points can be, for example, between about 750° C. and about 900° C. At the next stage, shown in FIG. 1B, crystallization initiating from surfaces of the glass particles forms a grain boundary network 6 of refractory silicates which are resistant to attack by fuel gases. The silicate crystalline network 6 (e.g. silicate crystals) becoming the polycrystalline matrix surrounding the glass areas 4 (which can be referred to grains or grain cores) enclosed by the network 6. In the final stage, shown in FIG. 1C, secondary crystals (e.g. silicate crystals) 8 form within the glass areas 4, resulting in a plurality of grain cores containing crystalline domains 8 within the glass areas 4 which are located in the crystalline matrix 6. Secondary silicate crystals 8 formed in the grains may improve the mechanical properties and chemical resistance of the seal.

Without wishing to be bound by a particular theory, it is believed that the second alkaline earth oxide, such as barium oxide, precipitates into the crystalline matrix 6 first, such that the matrix 6 is relatively barium oxide rich compared to the areas 4 and 8. Barium oxide forms a ternary oxide, such as a barium aluminosilicate crystals in the matrix 6. The glass areas 4 are relatively barium oxide poor compared to matrix 6 and contain free silica and calcium aluminosilicate crystals 8. Of course barium oxide may be present in the grain core areas 4, 8 and calcium oxide may be present in the matrix 6.

Without wishing to be bound by a particular theory, the crystallization of these glasses occurs after nucleation on the surface of the glass particles, where the free-energy for nucleation will be lower than for nucleation in the bulk. This nucleation occurs in the temperate range between from glass transition temperature, $T_g$ to softening point, $T_s$, during heating up to the sealing temperature. This forms the preferred seal microstructures of the embodiments of the invention compared to microstructures characterized by a fine crystallite network of alkaline-earth silicates on the scale of prior glass particles, with silica-rich residual glass remaining only in pockets or grain cores within the network.

Figure 2:
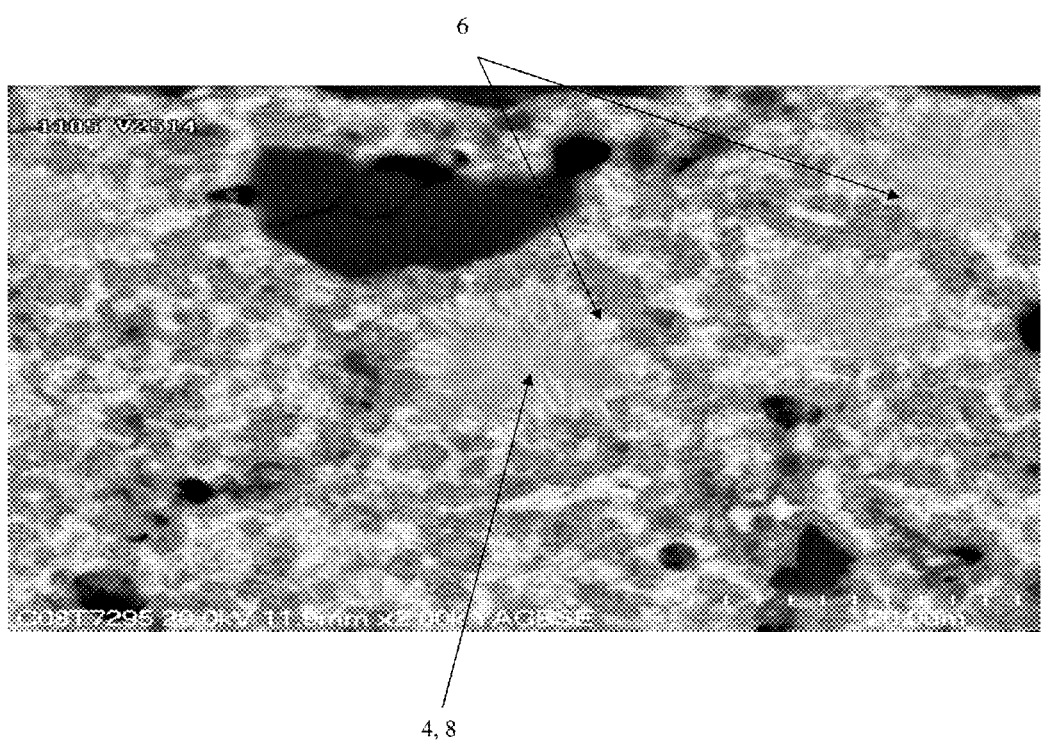
FIG. 2 is an SEM image of a glass ceramic seal comprising a crystalline matrix and a plurality of glass and crystalline domains within the matrix.

A non-limiting example of a seal formed according to an embodiment is shown in FIG. 2 where the crystalline matrix or grain boundary 6 comprises barium aluminosilicate, and the grain cores comprise calcium aluminosilicate crystals 8 in silica glass 4.

The seal microstructure, comprising a crystalline matrix on the scale of the original glass particles, enclosing pockets or grain cores of residual silica glass, imparts to the seal great strength, and resistance to wet fuels during fuel cell operation. The glass ceramic compositions are tailored to set and operate at fuel cell operating temperatures. Seals from the powdered glass flow and wet the seal surfaces, and crystallize during sealing producing the unique microstructure described above, and stays unchanged for long times thereafter. The viscosity of the resulting glass ceramic should be $10^8$ Pa-s or above, at the stack operating temperature.

Figure 3:
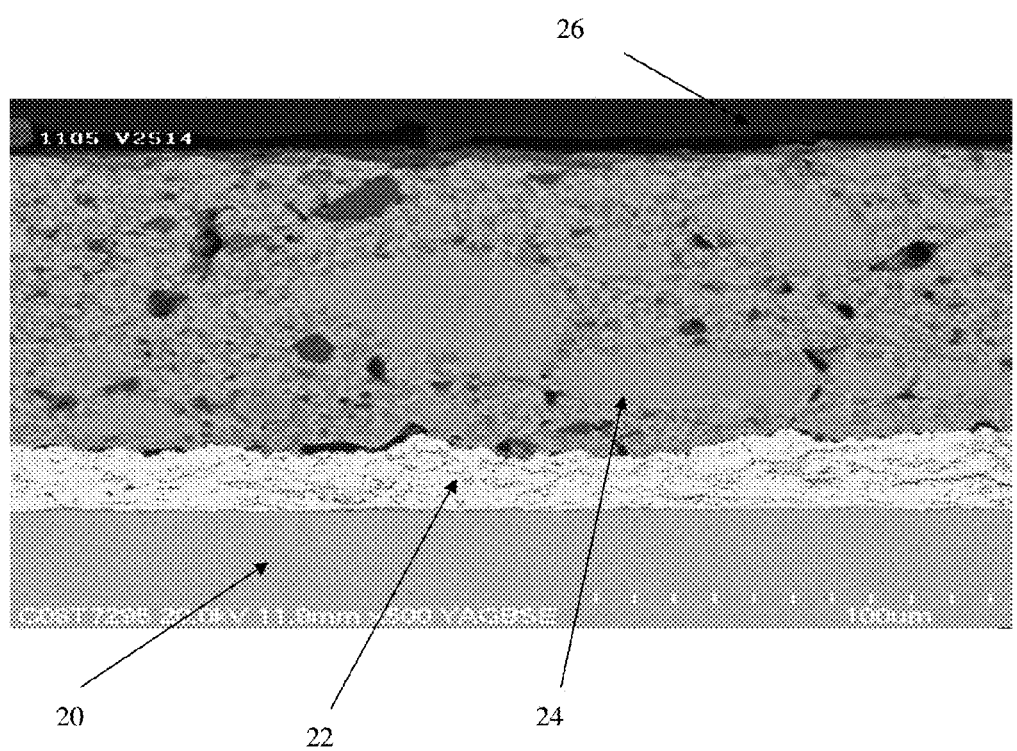
FIG. 3 is a cross-sectional SEM image of a seal formed on a solid oxide fuel cell component.

FIG. 3 is a non-limiting example of a seal formed on a fuel cell component, in accordance with one embodiment. As shown, a glass ceramic seal 24 is formed on a chromium-iron alloy interconnect (fuel cell component) 20 with an intermediate conductive lanthanum strontium manganite layer 22 between the seal 24 and the interconnect 20. The region above the seal 26 is ambient air.

Table 1 below illustrates exemplary seal compositions according to the embodiments and comparative embodiments.

TABLE 1

| Glass | Example | | | | | | | |
|---|---|---|---|---|---|---|---|---|
| | 1 | | 2 | | 3 | | 4 | |
| Constituent | wt. % | Mol. % | wt % | Mol. % | wt. % | Mol. % | wt % | Mol. % |
| CaO | 15.6 | 19.5 | 15.5 | 19 | 9 | 12.9 | 8.0 | 11.0 |
| BaO | 16.4 | 7.5 | 9 | 4 | 30 | 15.7 | 27.0 | 13.5 |
| Al2O3 | 13.8 | 9.5 | 14.5 | 10 | 17 | 13.3 | 14.0 | 10.5 |
| SiO2 | 54.3 | 63.5 | 56 | 64 | 43 | 57.3 | 50.0 | 64.0 |
| K2O | 0 | 0 | 5 | 3 | 1 | 0.9 | 1.0 | 1.0 |
| Total | 100.1 | 100 | 100 | 100 | 100 | 100.0 | 100.0 | 100.0 |
| Free SiO2 = Mol. % Silica − 2X (Mol. % CaO + BaO) | | 9.45 | | 18 | | 0 | | 15.0 |

The seal compositions in table 1 are explained in more detail below.

Example 1

A seal composition has 19.5 mol. % CaO, 7.5 mol. % BaO, 9.5 mol. % $Al_2O_3$ and 63.5 mol. % $SiO_2$. The calculated free silica in this composition is about 9.45 mol. %. This composition is suitable for sealing applications.

Example 2

A seal composition has 19.0 mol. % CaO, 4.0 mol. % BaO, 10.0 mol. % $Al_2O_3$, 64.0 mol. % $SiO_2$ and 3.0 mol. % $K_2O$. The calculated free silica in this composition is about 18.0 mol. %. This composition is suitable for sealing applications.

Comparative Example 3

A seal composition has 12.9 mol. % CaO, 15.7 mol. % BaO, 13.3 mol. % $Al_2O_3$, 57.3 mol. % $SiO_2$ and 0.9 mol. % $K_2O$. The calculated free silica in this composition is about 0 mol. %. This composition is not ideal for sealing applications.

Example 4

A seal composition has 11.0 mol. % CaO, 13.5 mol. % BaO, 10.5 mol. % $Al_2O_3$, 64.0 mol. % $SiO_2$ and 1.0 mol. % $K_2O$. The calculated free silica in this composition is about 15.0 mol. %. This composition is suitable for sealing applications.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

What is claimed is:

1. A method of forming a seal comprising:
   providing a substantially boron oxide and phosphorus oxide free glass powder composition comprising a first alkaline earth metal oxide, a second alkaline earth metal oxide, wherein the second alkaline earth metal oxide is different from the first alkaline earth metal oxide, aluminum oxide, and silica;
   heating the composition to sinter glass particles of the glass powder;
   continuing heating the composition to initiate crystallization from surfaces of the glass particles and to form a crystalline matrix comprising a first ternary aluminosilicate surrounding glass cores; and
   further continuing heating the composition to form a glass ceramic seal comprising second ternary aluminosilicate crystals in the glass cores enclosed by the crystalline matrix, wherein the second ternary aluminosilicate has a different composition than the first ternary aluminosilicate crystals.

2. The method of claim 1, wherein the step of providing the composition comprises depositing the composition on a surface of a component of a fuel cell stack.

3. The method of claim 2, wherein the composition is provided as a paste or as a green tape on a surface of an interconnect in a solid oxide fuel cell stack.

4. The method of claim 2, wherein silica is present in the provided composition in an amount such that molar percent of silica in the composition is at least five molar percent greater than two times a combined molar percent of the first alkaline earth metal oxide and the second alkaline earth metal oxide.

5. The method of claim 4, wherein the provided composition comprises:
   between about 5 mole percent and about 25 mole percent of the first alkaline earth metal oxide;
   between about 2 mole percent and about 25 mole percent of the second alkaline earth metal oxide;
   between about 5 mole percent and about 15 mole percent of the aluminum oxide;
   between about 45 mole percent and about 65 mole percent of the silica;
   zero to about 0.5 molar percent of boron oxide or phosphorus oxide; and
   substantially no other glass formers and easily reducible species.

6. The method of claim 5, wherein the first alkaline earth metal oxide comprises at least 80 molar percent calcium oxide and the second alkaline earth metal oxide comprises at least 80 molar percent barium oxide.

7. The method of claim 5, wherein:
   the crystalline matrix is barium rich and comprises barium aluminosilicate crystals;
   the crystalline matrix encloses barium lean glass cores;
   the glass cores comprise silica containing glass areas and calcium aluminosilicate crystals in the glass areas.

8. The method of claim 7, wherein the glass particles sinter below the glass softening point, the barium aluminosilicate crystals crystallize on the surfaces of the glass particles to form the crystalline matrix and the calcium aluminosilicate crystals form in the glass cores after formation of the crystalline matrix.

9. The method of claim 1, wherein the step of heating the composition comprises heating at a rate of between about 3° C. per minute to about 10° C. per minute to a temperature between about 900° C. and about 1000° C.

* * * * *